Jan. 9, 1951

H. W. GREENUP ET AL 2,537,631

LATEX COMPOSITIONS AND METHOD OF
PRODUCING POROUS DIAPHRAGMS
Filed Nov. 29, 1945

```
┌─────────────────────────────────────────────────────┐
│   DIPPING BATTERY SEPARATOR FORM INTO COAGULANT     │
└─────────────────────────────────────────────────────┘
                          │
                          ▼
┌─────────────────────────────────────────────────────┐
│   DIPPING FORM INTO LATEX OF FOLLOWING COMPOSITION  │
│                                                     │
│       LATEX                   100 PARTS             │
│       ZINC OXIDE                2 PARTS             │
│       SULFUR                   40 PARTS             │
│       ACCELERATOR               0.5 PARTS           │
│       CORN STARCH              20 PARTS             │
│       POTASSIUM HYDROXIDE       1.5 PARTS           │
│       FORMALIN                  5.3 PARTS           │
│       COUMARONE RESIN          15 PARTS             │
│       GILSONITE                25 PARTS             │
└─────────────────────────────────────────────────────┘
                          │
                          ▼
┌─────────────────────────────────────────────────────┐
│   CURING LATEX IN HOT WATER AND SIMULTANEOUSLY      │
│     HYDROLYZING AND DISSOLVING OUT THE STARCH       │
└─────────────────────────────────────────────────────┘
```

INVENTOR.
HAROLD W. GREENUP
AND
VICTOR M. GREEN

BY Ely & Frye

ATTORNEYS.

Patented Jan. 9, 1951

2,537,631

UNITED STATES PATENT OFFICE 2,537,631

LATEX COMPOSITIONS AND METHOD OF PRODUCING POROUS DIAPHRAGMS

Harold W. Greenup, Barrington, and Victor Malcolm Green, Portsmouth, R. I., assignors to The Firestone Tire & Rubber Company, Akron, Ohio, a corporation of Ohio Application November 29, 1945, Serial No. 631,786

6 Claims. (Cl. 18—58)

This invention relates to a latex composition, its use in the manufacture of microporous diaphragms which are suitable for use as battery separators and the like, and the diaphragms thus produced.

The diaphragm of this invention is a modified ebonite. It is formed by the deposition of latex on a form through any suitable means of coagulation. The form may, for example, be first dipped into a coagulant and then in the latex composition which constitutes one feature of the invention.

The procedural steps are illustrated in the accompanying drawing.

The latex composition comprises one or more extenders which impart strength and flexibility to the diaphragm. A mixture of Gilsonite or other hard asphalt and coumarone or other coumarone-indene-type resin is used for this purpose. The deposited latex is cured under water and is thus made to retain substantially all the water originally present in the latex gel or coagulum. This contributes materially to the porosity of the diaphragm. The latex includes starch or other suitable hydrolyzable carbohydrate which hydrolyzes during the underwater cure and is dissolved out of the diaphragm during the cure. This results in an increase in the porosity of the ebonite product. If this product is to be used as a battery separator, the increase in porosity decreases its electrical resistance, a desirable attainment. If, on the other hand, the diaphragm is to be used as a filter plate, the increase in porosity is, likewise, beneficial.

The latex bath is prepared by mixing several dispersions. A natural-rubber latex of about 60 per cent concentration is preferred as the basis of the bath. About 40 parts of sulfur are added in the form of a dispersion which is made with any suitable dispersing agent. The sulfur dispersion may, for example, be formed by ball-milling 50 parts of sulfur, 1.5 parts of Daxad No. 27 (a dispersing agent manufactured by Dewey and Almy Chemical Company, of Cambridge, Massachusetts, and described in the literature as "compounded substituted benzoic alkyl sulfonic acids"), and 0.5 part of commercial aqua ammonia (28 per cent). This dispersion is preferably prepared by ball-milling the ingredients with 48 parts of water for about forty-eight hours.

Any suitable accelerator of vulcanization may be employed. A preferred accelerator is dibenzothiazyl thiomethylurea (known in the industry as "L-60," produced by Monsanto Chemical Company). A suitable accelerator dispersion is prepared by ball-milling 50 parts of this accelerator with about 1.5 parts of Daxad No. 27 and 48.5 parts of water for about twenty-four hours.

To give the diaphragms the desired porosity, a material which hydrolyzes into one or more water-soluble components at the temperature of the cure, and during the cure, is added to the latex. Corn starch, which hydrolyzes into dextrin and then glucose, is preferred although other starches and other hydrolyzable carbohydrates, etc., may be used. The corn starch is added to the latex as a slurry which may, for example, be formed by mixing with an equal weight of water under high-speed agitation for from five to ten minutes. Seven and one-half to twelve parts of the starch will be used per fifty parts of rubber. No wetting agent or the like is required.

Two parts of zinc oxide are added as a dispersion. This may be formed by ball-milling for about twenty-four hours 40 parts of zinc oxide, 2 parts of Darvan No. 1 (a dispersing agent sold by R. T. Vanderbilt Company, of New York, described in the literature as "polymerized sodium salts of alkyl naphthalene sulfonic acids"), and 58 parts of water.

The latex is advantageously stabilized, as, for example, by the addition of formalin and potassium hydroxide. 40 per cent solution of the formalin may be used, and the potassium hydroxide is advantageously added as a 25 per cent solution.

The extender, which imparts strength and flexibility to the diaphragm, may be formed of one or more materials. It preferably comprises 12½ to 30 parts per 50 parts of rubber. Preferably the extender is composed of a mixture of Gilsonite and a coumarone-indene resin. (Gilsonite is a hard natural asphaltic material of high melting point.) Any asphalt melting between about 250° and 350° F. may be substituted for the Gilsonite. Gilsonite alone has been employed, but the addition of the coumarone-indene resin gives more flexibility to the diaphragm. The Gilsonite known in the trade as "S. S." (super select) grade is preferred. The coumarone-indene resin is preferably a high-grade coumarone resin with a melting point of about 230° to 280° F. The material or materials used as an extender should have a melting point of at least about 225° F.

For instance, a diaphragm prepared as herein more particularly described, but using 50 parts of Gilsonite and no resin, gave a diaphragm somewhat weaker than desired. Various formulae were tried using at least half as much coumarone as Gilsonite. Using 40 parts of Gilsonite and 40 parts of a coumarone resin to 100 parts of latex (dry weight), a very porous and otherwise very satisfactory separator which had an electrical resistance in the neighborhood of .06 ohm per square inch was obtained. Using 40 parts of the coumarone resin and 80 parts of Gilsonite to 100 parts of rubber, a good, porous separator was prepared, but the latex was very unstable and coagulated in twenty-four hours. Rapid coagulation was overcome by using 60 parts of coumarone resin and 60 parts of the Gilsonite. This gave a good, porous battery separator although it was somewhat thermoplastic at temperatures just above room temperature. Reducing the coumarone resin and Gilsonite content to 20 parts of each to 100 parts of rubber, a good separator was obtained with a resistance of .05 ohm per square inch. The preferred ratio is 15 parts of coumarone resin to 25 parts of Gilsonite, and this is employed in the following latex formula.

For use in the following formula the extender material was prepared by ball-milling for twenty-four hours 15 parts of coumarone resin, 25 parts of Gilsonite, 0.5 per cent potassium hydroxide, 3 per cent Darvan No. 1, and 36.5 parts of water. The latex bath was prepared by mixing various aqueous dispersions prepared as above described to give a bath of the following composition:

| | Dry basis |
|---|---|
| 60% latex | 100.0 |
| 40% zinc oxide dispersion | 2.0 |
| 50% sulfur dispersion | 40.0 |
| 50% L-60 accelerator dispersion | 0.5 |
| 50% corn starch suspension | 20.0 |
| 25% potassium hydroxide solution | 1.5 |
| 40% formalin solution | [1] 5.3 |
| 50% mixed extender dispersion | 40.0 |
| | 209.3 |

[1] Liquid.

The separators were prepared by dipping the forms into a 40 per cent solution of calcium chloride and then dipping into the latex bath. Other coagulating means may be employed. As soon as the dipped forms had been removed from the latex and the latex had set (not dried) on the outer surface—about four to ten minutes—the coated forms were placed in water in a steam autoclave and cured under 120 pounds' steam pressure (350° F.) for forty-five minutes. During the cure the rubber is vulcanized to ebonite, and the starch is hydrolyzed into water-soluble materials which are dissolved out of the product. The fact that the rubber is cured under water under pressure and, therefore, retains the water originally present in the latex gives it porosity which is increased by the dissolution and removal of the starch. Battery separators produced in this manner had a resistance of about .045 ohm per square inch.

Instead of thin microporous ebonite battery separators, filter plates, etc., may be similarly formed, the only difference in the products being the molds upon which the latex is deposited. It is not necessary to employ natural latex. Synthetic latices, reclaims, etc., may be similarly employed to produce ebonite-like diaphragms, using hard asphalts and coumarone-indene-type resins as extenders to strengthen and lend flexibility to the diaphragms produced. The conditions of cure may be varied although curing under water is necessary to produce a microporous product of the type here contemplated.

What we claim is:

1. A microporous ebonite diaphragm which comprises hard rubber formed of 50 parts of rubber vulcanized with 20 parts of sulfur, 7½ parts coumarone resin with a melting point of 230 to 280° F., and 12½ parts of asphalt melting at 250 to 350° F.

2. The method of producing a microporous ebonite-like diaphragm which comprises depositing on a form a rubbery latex which contains (1) sufficient sulfur to produce an ebonite-like product, (2) an extender composed largely of asphalt each of the essential ingredients of which has a melting point of at least 225° F. which imparts strength and flexibility to the diaphragm, and (3) corn starch, and curing the deposit in hot water while thus simultaneously hydrolyzing and dissolving out the starch.

3. The method of producing a microporous ebonite-like diaphragm which comprises depositing on a form a rubbery latex which contains (1) sufficient sulfur to produce an ebonite-like product, (2) extenders of hard asphalt and coumarone resin to strengthen the diaphragm and make it flexible, and (3) corn starch, and curing the deposit in hot water while simultaneously hydrolyzing the starch in the water to produce the microporous ebonite-like diaphragm.

4. The method of producing a microporous diaphragm which comprises forming on a suitable surface a thin deposit by coagulation from a bath comprising 50 parts natural latex which has dispersed therein 20 parts of sulfur, 12½ to 30 parts of hard asphalt and coumarone resin which strengthens and imparts flexibility to the finished diaphragm, and 7½ to 12 parts of corn starch and other vulcanizing ingredients other than sulfur, and thereafter vulcanizing the deposit to ebonite under heated water which hydrolyzes the starch into water-soluble decomposition products during the cure.

5. The method of producing a microporous ebonite battery separator which comprises coating a suitable form with a coagulant, dipping the same into 50 parts of natural rubber latex which has dispersed therein 20 parts sulfur, 7½ parts coumarone resin with a melting point of 230 to 280° F., 12½ parts of asphalt melting at 250 to 350° F., and 10 parts of corn starch, and thereafter vulcanizing the deposit under hot water which cures the rubber and simultaneously hydrolyzes the starch to produce a microporous ebonite.

6. A natural latex composition which comprises dispersed therein, by dry weight, 50 parts rubber of the latex, 20 parts sulfur, 7½ to 12½ parts of corn starch and 12½ to 30 parts of an extender composed essentially of hard asphalt and at least half as much coumarone-indene resin as asphalt, each of which ingredients has a melting point of at least 225° F., which extender imparts strength and flexibility to the ebonite product obtained by coagulation and vulcanization of the latex composition.

HAROLD W. GREENUP.
VICTOR MALCOLM GREEN.

REFERENCES CITED

The following references are of record in the file of this patent:

UNITED STATES PATENTS

| Number | Name | Date |
|---|---|---|
| 1,968,887 | Hansen | Aug. 7, 1934 |
| 2,052,490 | Reinhardt et al. | Aug. 25, 1936 |
| 2,155,016 | Kershaw | Apr. 18, 1939 |
| 2,175,798 | Hauser | Oct. 10, 1939 |
| 2,291,786 | Beal | Aug. 4, 1942 |

FOREIGN PATENTS

| Number | Country | Date |
|---|---|---|
| 804,818 | France | Aug. 10, 1936 |

OTHER REFERENCES

"Cumar," pages 12, 13 and 35, pub. 1936 by The Barrett Co., New York.